Figure 1:
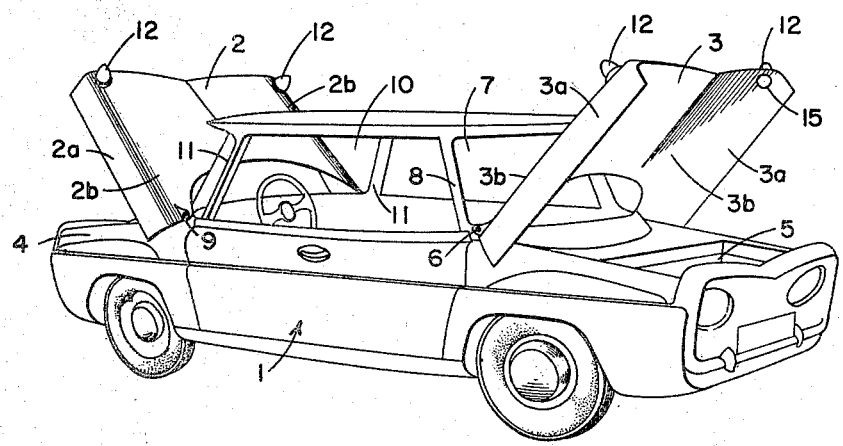

March 23, 1965 B. BARÉNYI 3,175,186
LIGHTING ARRANGEMENT, AND TROUBLE WARNING
LIGHTS FOR MOTOR VEHICLES
Filed Jan. 18, 1960 2 Sheets-Sheet 1

INVENTOR
BELA BARÉNYI
BY Dicke, Craig & Freudenberg
ATTORNEY

March 23, 1965

B. BARÉNYI 3,175,186

LIGHTING ARRANGEMENT, AND TROUBLE WARNING
LIGHTS FOR MOTOR VEHICLES

Filed Jan. 18, 1960

2 Sheets-Sheet 2

INVENTOR.
BELA BARÉNYI

BY Dicke + Craig

ATTORNEYS.

United States Patent Office 3,175,186
Patented Mar. 23, 1965

3,175,186
LIGHTING ARRANGEMENT, AND TROUBLE
WARNING LIGHTS FOR MOTOR VEHICLES
Béla Barényi, Stuttgart-Vaihingen, Germany, assignor to
Daimler-Benz Aktiengesellschaft, Stuttgart-Unterturkheim, Germany
Filed Jan. 18, 1960, Ser. No. 2,894
Claims priority, application Germany, Jan. 24, 1959,
D 29,848
3 Claims. (Cl. 340—87)

The present invention relates to a further improvement and construction of a lighting arrangement, according to which one light each is arranged either directly or at some distance from the front and rear vehicle end within the region of the transition or near the impact edges of the lateral walls and top surfaces of the vehicle body on each side of the vehicle.

The present invention essentially consists in arranging the lights in a pair-like manner at a forward and rearward hood or lid cover at such a distance from the hinges thereof that with the hood or lid opened up, they are disposed above the road surface, and with relatively taller vehicles still come to lie within the area of or above the height of the roof, and therewith illuminate not only, as the known individual lights arranged in the center of the luggage compartment lid in the rearward direction, but also above and over the vehicle and/or laterally past the vehicle body thereof in the forward or rearward direction thereof, respectively.

The purpose of the present invention is to give, during breakdowns, especially on expressways or high speed turnpikes, for example, on autobahns, to the other participants of the traffic a clear and timely warning signal which is visible even in that case when the persons standing at or near the vehicle in case of repairs that have to be made, cover the headlights, rear lights, back-up lights, parking lights, or the like. Furthermore, the lights in accordance with the present invention are also intended to illuminate sufficiently clearly the luggage and engine compartments from the outside toward the inside thereof, without blinding effect, as soon as the engine hood or luggage lid is opened. With a closed hood or lid the lights according to the present invention are to be readily visible from the vehicle interior as well as from the outside thereof, from the sides, from the rear and from the front thereof. Furthermore, since the lights according to the present invention are not arranged directly at the vehicle lateral walls, any damage to these lights is also avoided in a far-reaching manner.

It is known in the prior art in connection with a relatively short, rearwardly disposed luggage compartment lid pivotally secured at a relatively low point to arrange in the center thereof a single light, which is not a blinker light, in such a manner that in a pivotally opened position of the lid, opened-up by about 90° with respect to the road surface, the single light constitutes a rear light or back-up light producing a light beam directed toward the rear. There exists the danger that a person standing in front of the luggage space may cover such a rear light. Furthermore, the individual light does not give any indication concerning the width of the vehicle. All of these disadvantages are eliminated by the present invention.

Accordingly, it is an object of the present invention to provide lights for motor vehicles which are so arranged and positioned in relation to the vehicle as to obviate the shortcomings of the prior art devices.

Another object of the present invention resides in the provision of lights arranged on hoods or lids of motor vehicles which not only indicate the width of the vehicle but also give a clear warning to other participants of the traffic in case the vehicle in question has to be stopped or comes to a halt by reason of a breakdown or the like.

Still another object of the present invention resides in the provision of traffic lights, which are so arranged near the four corners of the vehicle as to not only provide a signalling light to other participants of the traffic but also to illuminate the interior of the luggage and/or engine compartment in a completely satisfactory manner without blinding the other participants of the traffic.

Figures 2, 3:
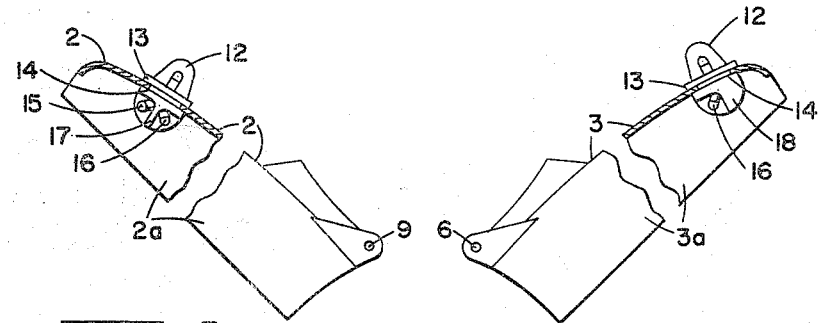
Figure 4:
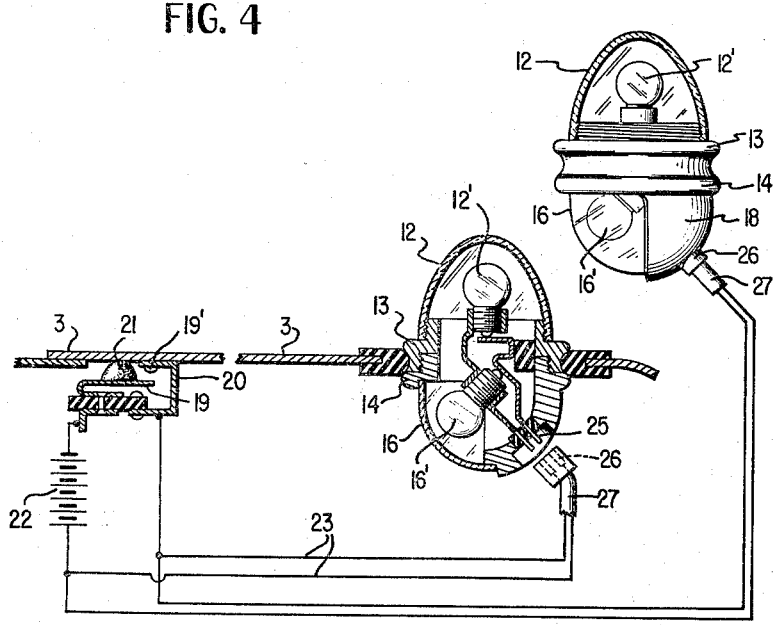

These and other objects, features and advantages of the present invention will become more obvious from the following description when taken in connection with the accompanying drawing which shows, for purposes of illustration only, two embodiments in accordance with the present invention and wherein FIGURE 1 is a schematic perspective view of a passenger motor vehicle having a pontoon-shaped vehicle body and a relatively flat roof resting on four columns and including lights in accordance with the present invention, FIGURE 2 is a partial cross-sectional view, on an enlarged scale, through a single light arranged at the hood or lid of a motor vehicle, in accordance with the present invention, FIGURE 3 is a partial cross-sectional view similar to FIGURE 2 of a modified embodiment of a light in accordance with the present invention, and FIGURE 4 is a diagrammatic showing of the circuitry connecting a hood-operated controlling switch and the lights controlled thereby.

Referring now to the drawing, wherein like reference numerals are used throughout the various views to designate corresponding parts, and more particularly to FIGURE 1, reference numeral 1 generally designates therein the vehicle body which may be of pontoon-like shape and which is covered by a front and rear hood or lids 2 and 3, respectively. The hood 2 thereby is adapted to close off the engine compartment 4 and the lid 3 the luggage compartment 5 against the top thereof. However, it is also understood that it is within the scope of the present invention that the arrangement be reversed, i.e., that the lid 3 covers a rear engine compartment and the hood 2 a forwardly disposed luggage compartment. The engine hood 2 and luggage compartment lid 3 extend over the entire width of the vehicle body, i.e., also over the wheel casings of the front and rear wheels. The hood and lid thereby include essentially vertically disposed lateral wall surfaces 2a and 3a, respectively, which pass over into the top surfaces 2 and 3 by means of rounded-off portions 2b and 3b, respectively. Simultaneously therewith, the hood or lid lateral walls complement the lateral walls of the vehicle body 1. The pivotal arrangement 6 of the luggage compartment lid 3 is disposed ahead of the lower rim of the rear window 7 within the area of the rearwardly disposed roof columns 8. The pivotal connection 9 of the engine hood 2 is disposed behind the lower rim of the windshield 10 within the region of the forwardly disposed roof columns 11. The windshield 10 is inclined toward the rear and the rear window 7 toward the front in such a manner that the upper edges of the two windows are disposed closer to one another than the lower edges thereof.

According to the present invention, a light 12 is arranged on each vehicle side in front and in the rear of the vehicle at the laterally rounded-off portions 2b and 3b of the engine hood 2 and the luggage compartment lid 3, and more particularly, preferably outside the wheel tread and close to the end of the hood or lid, i.e., practically in the upper vehicle corners in such a manner that the blinker lights disposed on the same vehicle side are equidistant from the vehicle longitudinal center plane.

As shown in FIGURES 2 and 3, the outer lights 12 have a pear-like shape or mushroom-like configuration. The securing fittings 13 for the lights 12 are made of two parts, and are effective as a clamping fitting to be extended through a hole or bore in the hood or lid, for example, provided with a threaded connection so as to constitute a simultaneous light mounting 14 at the hood or lid underside. Dual lights 15 and 16 are provided as interior lights according to the embodiment of FIGURE 2, between which a non-transparent wall 17 is arranged which prevents the passage of light therethrough. The interior lights 15 project the light rays thereof outwardly, i.e., either forwardly or backwardly, and therewith complete the lighting effect of the external lights 12. The lights 15 thereof are colored for that purpose in the same manner, especially of red color. In view of the forwardly disposed closing rim portion 2' and the largest angle of opening of the engine hood 2 in the completely opened position thereof which have to be duly considered in connection with the present invention, the lights 12 and 15 are displaced so far forwardly and are of such height that, viewed from the same height in front thereof, they just complete each other exactly in the lighting effect thereof. The interior rear light 16 which possibly has to be provided only on one side of the vehicle, projects the light rays thereof, preferably of white color, in a non-blinding manner inwardly and thereby illuminates the engine or luggage space. A dual arrangement of the interior light on each hood or lid however, is advantageous in case the light of one vehicle side may break down or fail to operate.

In the embodiment of FIGURE 3, a separate outwardly effective interior light such as light 15 of FIGURE 2, is dispensed with and only a single interior light 16 is provided. The latter is covered against the outside thereof by a light-opaque screen 18 which precludes blinding of persons standing in proximity thereto and thereby places greater emphasis on the outer blinker light 12. The light arrangement according to FIGURES 2 and 3, may be used either each by itself or combined with each other.

The energizing circuits for the lights are shown in FIGURE 4. These are shown in connection with the lid member 3, but since the light circuits in connection with the hood 2 are exactly the same, a further showing of these would amount to mere duplication.

The above circuits include a switch of which resiliently movable member 19 is provided with a resilient member 21, the latter being engaged by lid 3 in its lowered position and holding member 19 out of contact with stationary switch member 19', stationary part 20 furnishing a ground for the latter member. Circuit means 23 connect lamps 12', 16' of the lights 12 with battery 22 and the switch 19, 21. The circuit means embody cable means 27 having terminal means 26 adapted for connection to the lamp terminals of which one pair is shown at 25. Upon raising of the lid 3, pressure is removed from switch members 21 and 19, the latter now making contact with switch member 19'.

The outer lights 12 may be screened in the direction toward the vehicle driver seat by means of appropriate light-opaque or light screens. Moreover, the light connections and the securing fittings or sockets are so constructed and arranged as to be accessible only from the hood or lid underside, i.e., only when the hoods or lids are open.

While I have shown and described two embodiments in accordance with the present invention, it is understood that the same is not limited thereto but is susceptible of many changes and modifications within the spirit and scope of the present invention and I, therefore, do not wish to be limited to the details shown and described herein but intend to cover all such changes and modifications as are encompassed by the scope of the appended claims.

I claim:
1. A lighting arrangement for vehicles, especially an automobile provided with a vehicle body having hood means at each end thereof and a roof, each of said hood means having a width extending substantially the width of said vehicle body, each hood means having a substantially horizontal center portion and downwardly disposed lateral portions on each side thereof, means for pivotally securing said hood means to said vehicle body to enable pivotal movement of said hood means to an open position wherein one end thereof is elevated above said roof, the upper ends of said hood means in the open position being above said roof, a pair of upwardly projecting light structures positioned upon the horizontal center portion of each hood means at opposite sides thereof essentially at the junctions with said lateral portions and near the outer extremities of said hood means, a pair of lower light structures are secured at the underside of said hood means beneath and connected to the respective pair of upper light structures, means including switch means, whereby upon pivotal movement of said hood means into an open position, said upwardly projecting light structures throw light over said roof of the automobile and are thereby visible from the front, rear and sides of the automobile and whereby said lower light structures illuminate under said hood means.

2. A lighting arrangement for vehicles, especially an automobile provided with a vehicle body having hood means at each end thereof and a roof, each of said hood means having a width extending substantially the width of said vehicle body, each hood means having a substantially horizontal center portion and downwardly disposed lateral portions on each side thereof, means for pivotally securing said hood means to said vehicle body to enable pivotal movement of said hood means to an open position wherein one end thereof is elevated above said roof, the upper ends of said hood means in the open position being above said roof, a pair of upwardly projecting light structures positioned upon the horizontal center portion of each hood means at opposite sides thereof essentially at the junctions with said lateral portions and near the outer extremities of said hood means, a pair of lower light structures secured at the underside of said hood means beneath and connected to the respective pair of upwardly projecting light structures, said upwardly projecting light structures and said lower light structures including electric lamps, means for energizing said lamps including switch means, said switch means being secured at the respective hood means to automatically energize said lamps during opening of the respective hood means and to automatically de-energize said lamps upon closing of the respective hood means, whereby upon pivotal movement of said hood means into an open position, said upwardly projecting light structures throw light over said roof of the automobile and are thereby visible from the front, rear and sides of the automobile and whereby said lower light structures illuminate under said hood means.

3. A lighting arrangement according to claim 2, wherein said connected upper and lower light structures are secured to said hood means by means rendering said light structures readily detachable from said hood means.

References Cited in the file of this patent

UNITED STATES PATENTS

| | | |
|---|---|---|
| 2,054,919 | Anibal | Sept. 22, 1936 |
| 2,329,882 | Clark | Sept. 21, 1943 |
| 2,440,011 | Hallman | Apr. 20, 1948 |
| 2,736,005 | Graddock | Feb. 21, 1956 |
| 2,891,235 | Haepert | June 26, 1959 |
| 2,894,257 | Crooks | July 7, 1959 |
| 2,905,925 | Whiteneck | Sept. 22, 1959 |

FOREIGN PATENTS

| | | |
|---|---|---|
| 660,801 | France | Feb. 25, 1929 |